United States Patent [19]

Herth et al.

[11] 4,244,340
[45] Jan. 13, 1981

[54] METHOD AND APPARATUS FOR CONTROLLING FUEL MANAGEMENT FOR AN INTERNAL COMBUSTION ENGINE

[75] Inventors: Harro Herth, Schwieberdingen; Hans Schnurle, Walheim; Ulrich Drews, Vaihingen-Pulverdingen; Erich Singer, Besigheim; Bernd Kraus; Peter Werner, both of Stuttgart, all of Fed. Rep. of Germany

[73] Assignee: Robert Bosch GmbH, Stuttgart, Fed. Rep. of Germany

[21] Appl. No.: 895,683

[22] Filed: Apr. 12, 1978

Related U.S. Application Data

[63] Continuation of Ser. No. 676,997, Apr. 14, 1976, abandoned.

[30] Foreign Application Priority Data

Apr. 18, 1975 [DE] Fed. Rep. of Germany ....... 2517269
Dec. 30, 1975 [DE] Fed. Rep. of Germany ....... 2559046

[51] Int. Cl.$^3$ .......................... F02D 5/00; F02M 7/00
[52] U.S. Cl. ..................................... 123/440; 123/479; 123/489
[58] Field of Search ...... 123/32 EA, 32 EE, 119 EC, 123/32 EK; 60/276, 277, 285

[56] References Cited

U.S. PATENT DOCUMENTS

| | | | |
|---|---|---|---|
| 3,890,946 | 6/1975 | Wahl | 60/276 |
| 3,903,853 | 9/1975 | Kizler et al. | 60/285 |
| 3,916,170 | 10/1975 | Norimatsu et al. | 123/32 EE |
| 3,916,848 | 11/1975 | Schmidt | 123/32 EE |
| 3,926,154 | 12/1975 | Williams | 60/276 |
| 3,938,075 | 2/1976 | Reddy | 60/285 |
| 3,938,479 | 2/1976 | Oberstadt | 123/32 EA |
| 3,948,228 | 4/1976 | Luchaco | 123/32 EA |
| 3,977,375 | 8/1976 | Laprade et al. | 60/276 |
| 4,167,396 | 9/1979 | Kondo et al. | 60/276 |

*Primary Examiner*—Charles J. Myhre
*Assistant Examiner*—Andrew M. Dolinar
*Attorney, Agent, or Firm*—Edwin E. Greigg

[57] ABSTRACT

A control circuit of a fuel management control system for internal combustion engines monitors the operation of an exhaust line sensor. When the oxygen sensor is perceived to be inoperative, for example, due to low ambient temperature, the previously closed loop control process governing the fuel management control signals is interrupted and a direct forward control process is substituted therefor. The reference voltage is changed during this time for eventual adaptation to the changeover to closed loop feedback control after the oxygen sensor again becomes operational.

42 Claims, 13 Drawing Figures

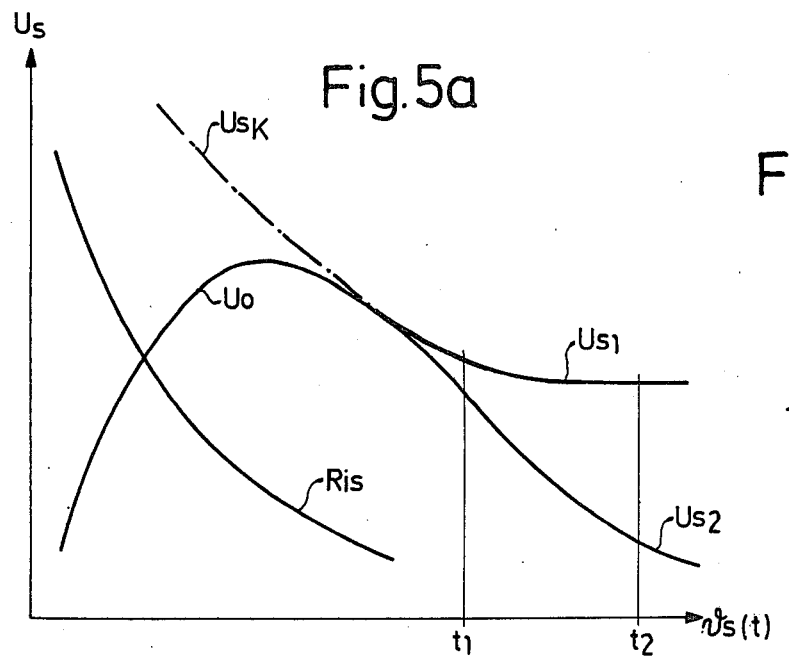
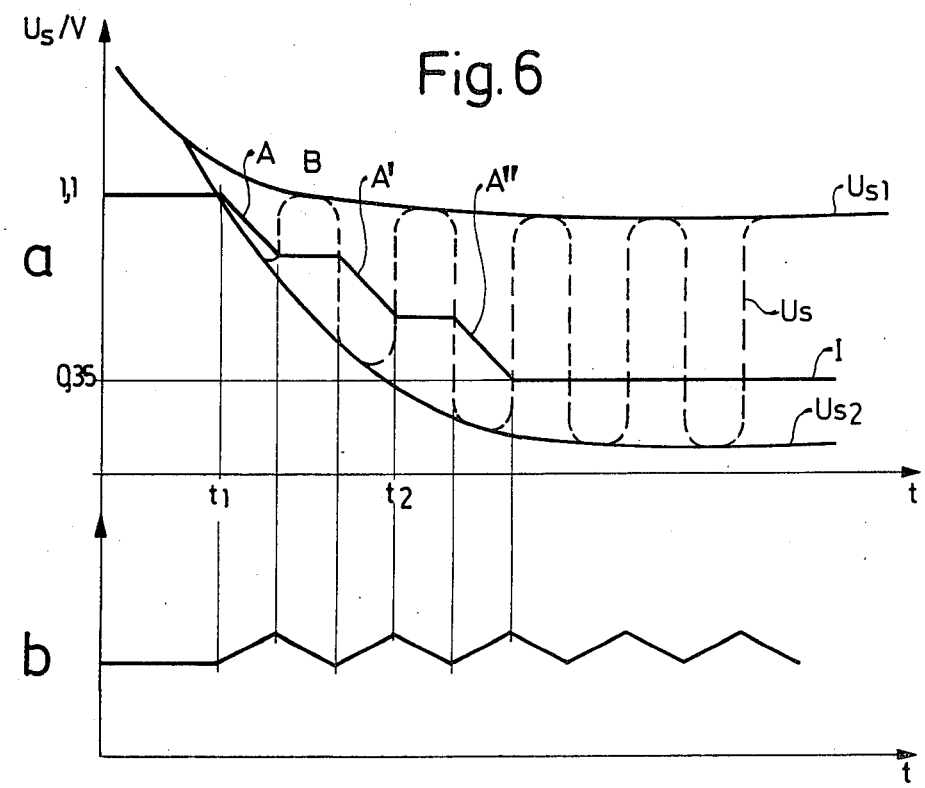

METHOD AND APPARATUS FOR CONTROLLING FUEL MANAGEMENT FOR AN INTERNAL COMBUSTION ENGINE

This is a continuation, of application Ser. No. 676,997 filed Apr. 14, 1976, now abandoned.

BACKGROUND OF THE INVENTION

The invention relates to the fuel management control system of internal combustion engines. More particularly, the invention relates to a method and an apparatus for determining the operational readiness of an oxygen sensor for measuring the exhaust gas composition. The fuel management control system could be of any suitable type, using carburetion or fuel injection. In fuel injection, for example, control pulses would be applied to electromagnetically actuated fuel injection valves in synchronism with the crankshaft rotation and in dependence on the engine rpm and on the air flow rate. When mixture compressing, internal combustion engines are supplied with fuel, the fuel must be so adapted to the aspirated air quantity that the combustion process is complete and does not lead to a loss of power, nor excess fuel, which would produce an excessive amount of toxic exhaust gas constituents.

An attempt is thus made to supply a fuel-air mixture to the combustion chambers which is in the stoichiometric ratio (air no. $\lambda=1$) or in which there is excess air and which, in any case, can be adjusted to preselected values. If the engine is operated in the domain of excess air, i.e., at its lean running limit, it is particularly easy to reduce exhaust gas constituents and to conform to the ever more rigid requirements for atmospheric purity.

The amount of fuel which must be supplied to the engine is determined on the basis of known criteria, among which are, principally, the engine rpm and the air flow rate. However, it may be desirable to check the air-fuel mixture and to correct its ratio if the desired values are not maintained. This purpose can be attained by employing a closed loop control process using a known so-called $\lambda$-sensor. Such a $\lambda$-sensor is used nowadays in internal combustion engines and is capable to generate a signal related to the composition of the exhaust gas indicating certain values of the air number $\lambda$. In particular, the present day $\lambda$-sensor generates a relatively low positive potential when the engine in which it is used operates with a rich mixture, indicating a value $\lambda$ less than 1. If the mixture used is lean, the output signal from the $\lambda$-sensor is effectively zero. When the fuel-air mixture changes composition and passes through the value $\lambda=1$, the signal from the $\lambda$-sensor undergoes an abrupt change in the manner of a step function and its use is thus limited substantially to the region in the vicinity of $\lambda=1$, at least with great precision. The change from a very low output voltage to what is essentially the maximum output voltage is very abrupt. However, a $\lambda$-sensor of this type may be used not merely to adjust the fuel quantity fed to the engine, but to control it in a closed loop by making the internal combustion engine itself the controlled system and by letting the fuel management control system constitute the actual controller which is supplied with the output signal of the $\lambda$-sensor as the actual value of the control variable.

When a $\lambda$-sensor is used in a closed control loop for operating a fuel management control system, a difficulty arises from the fact that the sensor may not always be in normal operating condition, for example, when it is cold, when the engine itself is cold, or during hot starting after a short period of rest. Sometimes the electrical connections leading to the sensor may be broken or short-circuited. In all of these cases, of which that of a cold sensor probably occurs most often, the control process is defective because when cold, the $\lambda$-sensor does not generate a usable output signal.

OBJECT AND SUMMARY OF THE INVENTION

Accordingly, it is a principal object of the present invention to provide a method and an apparatus for setting the length or duration of the fuel injection control pulses in a fuel management control system which operates with a closed control loop based on the air number $\lambda$ and in which the above-mentioned difficulty is avoided so that, when the oxygen sensor is cold and the engine requires substantial amounts of fuel, the control loop is prevented from erroneously supplying a lean mixture.

In a controlled fuel management system which also considers peripheral conditions like altitude compensation and air temperature compensation, it may happen that the control range is as high as $+$ or $-30\%$ so that, in case of oxygen sensor failure, the resulting leaning out of the fuel mixture by 30% with a cold sensor would not be tolerable.

In order to attain the objective, the invention proceeds from the above-described process and provides that when the $\lambda$-sensor is inoperative, which would invite an erroneous control signal and an erroneous amount of fuel for the aspirated air, the improved controller, according to the invention, measures the time during which the $\lambda$-sensor is inoperative and shuts off the operation of the closed control loop and substitutes therefor a simple forward control or adjustment while, at the same time, adjusting a reference signal in such a manner that, after the $\lambda$-sensor reenters the system and the control loop is closed, the reference signal is gradually adapted to the actual operational condition of the engine.

An apparatus for carrying out this process improves the device which determines, e.g. the duration of fuel injection pulses in a closed control loop by means of a $\lambda$-sensor, the device being further of the type which compares the $\lambda$-sensor signal with the reference signal in a comparator circuit which feeds a subsequent integrator circuit to generate an output signal provided to the fuel injection system. The invention further provides a first timing circuit, controlled by the output of the comparator circuit, for shutting off the integrator and substituting a predetermined output signal, and further provides a second timing circuit which, at first, raises the reference signal and then lowers it again gradually when the $\lambda$-sensor becomes operational.

These features result in the advantage that, when the $\lambda$-sensor is inoperative, the control loop does not attempt to provide a drastically erroneous signal and, at the same time, a re-adaptation of the control loop signal to closed loop operation is possible without oscillations or abrupt changes of the control signal when the $\lambda$-sensor again becomes operative.

Yet another and very important aspect of the present invention is that the reference signal which is compared with the signal $U_s$ from the $\lambda$-sensor, and which will also be referred to as a threshold voltage or command voltage, is itself capable of adjustment. This adjustment of the reference signal not only corresponds to a decrease in time but, in addition, the reference value is held in a controlled manner in dependence on the total performance of the system, including the internal combustion engine itself. In a particularly preferred exemplary embodiment of the present invention, the decrease of this threshold voltage, which, as shall be explained below, is generated by the fuel injection system itself, takes place in such a manner that the range of the adjustment and the speed of the adjustment of the nominal command value, especially, as in this case, of the threshold value, is itself subject to a type of closed loop control. In this manner, the value of the threshold signal may be particularly well and precisely adapted to any prevailing condition of the sensor. A change of the command value in controlled manner, as described here, is especially useful for those operational conditions of the λ-sensor in which it is not yet capable of generating its full working voltage, for example because it is too cold, and in which the output voltage from the λ-sensor is still subject to large fluctuations.

It is thus a partial object of the present invention to provide for the precise adjustment of the threshold value in order to adapt it to the prevailing condition of the λ-sensor.

This object is attained, according to the invention, by decreasing the threshold signal in a closed control loop after the whole system has changed over to forward control and by maintaining the threshold voltage at all times higher than the sensor voltage for a lean mixture.

In such a system, it is particularly advantageous if the decrease of the threshold voltage is performed only when the sensor itself shows a lean mixture and when the entire control system is moving in the direction toward a rich mixture.

The invention will be better understood as well as further objects and advantages thereof become more apparent from the ensuing detailed specification of preferred embodiments taken in conjunction with the drawing.

BRIEF DESCRIPTION OF THE DRAWING

FIG. 5a is a diagram showing the output voltage in the internal resistance of the λ-sensor as a function of temperature or time;

FIG. 5b is the equivalent circuit of the λ-sensor;

FIG. 6a is a set of curves showing the λ-sensor voltage in a normal operating cycle indicating two limiting curves for rich and lean mixture, respectively, as a function of time;

FIG. 6b is a schematic curve showing the integrated output voltage of the λ-controller for adjusting the length of fuel injection pulses;

DESCRIPTION OF THE PREFERRED EMBODIMENTS

Figure 1:
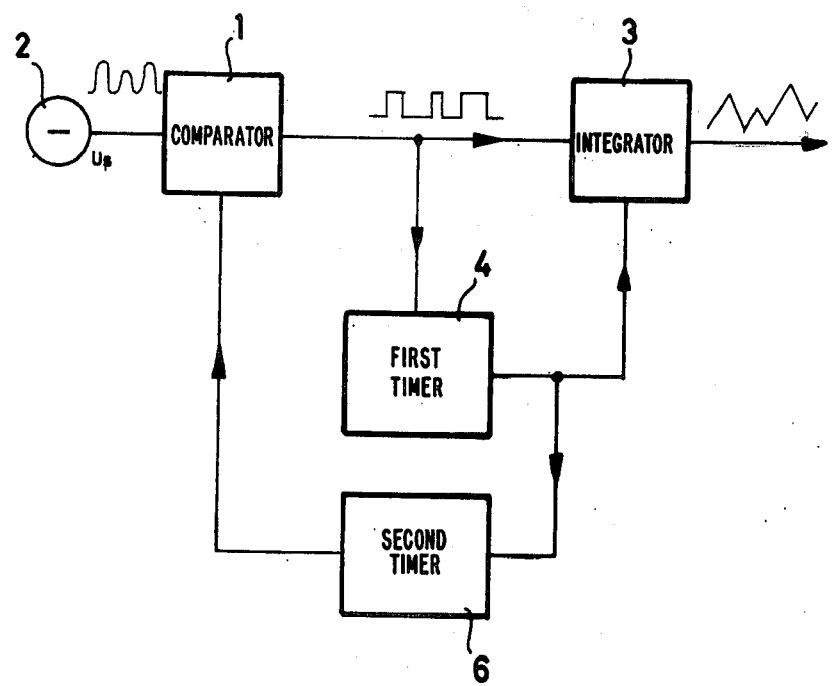
FIG. 1 is a block diagram of an apparatus for recognizing the operational condition of the λ-sensor and for λ-control.

Turning now to FIG. 1, it will be seen that the apparatus according to the invention for recognizing the operational state of the λ-sensor and for switching the system from closed loop control to forward control when the λ sensor is defective, substantially includes a comparator circuit 1 whose input receives the control signal $U_s$ of the λ-sensor 2. Under normal conditions, the comparator circuit 1 generates a reference signal which is very precise and which opposes the signal $U_s$ of the λ-sensor. The output from the comparator circuit 1 is fed to an integrator block 3 whose output carries a signal which is used to adjust the final control element in a fuel management control system for example, the multiplier stage of a fuel injection system. However, the output signal may also be generated under the influence of a first timer circuit 4 which also influences the integrator 3 and whose own input is connected to the output of the comparator circuit 1, thereby monitoring it. Connected behind the first timer circuit 4 is a second timer circuit 6 whose output goes to the comparator circuit 1 and affects the reference signal which opposes the λ-sensor signal.

Figure 2A:
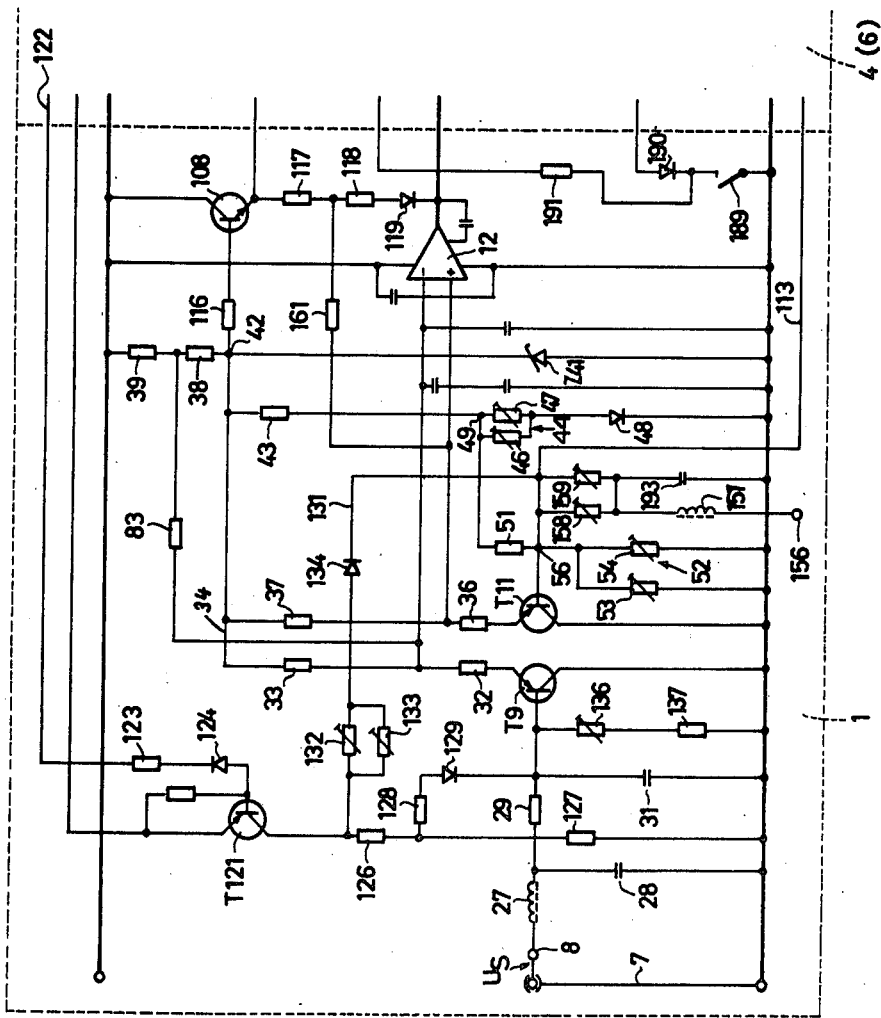
FIGS. 2a and 2b are detailed circuit diagrams of the apparatus shown in the block diagram of FIG. 1.

A detailed description of the circuit within the blocks of FIG. 1 is shown in FIG. 2. In FIG. 2a there will be seen the λ-sensor 7 whose output is a positive signal with respect to ground or with respect to the negative supply line and this signal is fed to a contact 8 in the comparator circuit 1. It should be noted that, in normal conditions, the output signal $U_s$ of the λ-sensor varies between the values 100–200 mV and may reach 700 mV (in the region λ=1). The comparator circuit 1 substantially consists of two transistors T9 and T11 which control the subsequent operational amplifier 12. The base of transistor T11 receives the reference voltage which is to be compared with the output voltage from the λ-sensor. During normal operation, the result of the voltage comparison is that the output voltage from the operational amplifier 12 alternates between two extreme values, for example between the positive and minus supply voltages.

The output signal from the operational amplifier 12 flows via the connecting conductor 13 to the bases of two transistors T14 and T16 which are part of the integrating circuit and which, in turn, control an operational amplifier 17. (See FIG. 2b) The voltage jumps at the output of the operational amplifier 12 are transformed by the operational amplifier 17 into a voltage which changes during the integration period and this voltage is fed, for example, to the multiplying stage of a subsequent fuel injection system and affects the injection time $T_i$ of the fuel injection valve. The integration takes place by means of the parallel capacitors 18 and 19 connected between the inverting input and the output of the operational amplifier 17.

The timing circuits are formed by the transistors T21–T26 which have several output lines terminating in other elements of the circuit. The circuit includes a number of peripheral elements which will be treated in detail below.

The requirements and conditions which the overall circuit must fulfill are the following:

1. The system is switched to a forward, open loop control as long as the λ-sensor which is, preferably, an oxygen sensor, does not generate an output signal dependent on exhaust gas composition.

2. The adaptation during forward, open loop control must be freely selectable.

3. After the λ-sensor has properly warmed up and becomes operational, the system must switch to closed loop control and there should be no abrupt leaning out of the fuel-air mixture at the instant of transition from open loop to closed loop control.

4. The circuit which is responsible for recognizing the operational state of the sensor must change the system over the open loop, forward control when the sensor fails, when the sensor is too cold, or when an interruption of the circuitry occurs. A short circuiting of the λ-sensor or of the signal line from the sensor is not as critical as the other conditions, because, during closed loop control, such an event would merely lead to an enrichment of the fuel-air mixture fed to the engine but the operability of the vehicle will generally be maintained.

5. During the start of the internal combustion engine, the system must be switched to open loop, forward control.

The method of operation of the circuit of FIG. 2 will be explained in detail in connection with an explanation of its circuitry.

In order to eliminate any possible high frequency influences, the output signal $U_s$ from the λ-sensor is first fed through a low pass filter circuit consisting of a coil 27 and a capacitor 28 connected to ground. The signal then travels through a resistor 29 connected in series with the coil and a further capacitor 31, also connected to ground, to the base of the transistor T9 which is connected as an emitter follower and whose only purpose is to shift the d.c. bias of the λ-sensor signal $U_s$ and to transmit it to the operational amplifier 12. The emitter of transistor T9 is connected through resistors 32 and 33 with a junction 34 to which is also connected the emitter of transistor T11 via two series resistors 36 and 37. The junction 34 is connected through series resistors 38 and 39 to the positive supply line of the circuit. The junction of resistors 32 and 33 is fed to the inverting input of the subsequent operational amplifier 12 while the junction of resistors 36 and 37 is fed to the non-inverting input of the operational amplifier 12, which performs the actual comparison of the voltages fed to the bases of transistors T9 and T11. The reference voltage, which must be very precise, and which is fed to the base of the transistor T11, is obtained in the following manner. Connected in series with resistors 38 and 39 is a Zener diode Z41 whose anode is connected to ground so that its cathode is at constant potential. It is required that the Zener diode be temperature-compensated. However, such a compensation is not an easy matter because the supply voltage is generally obtained from the vehicle battery and may vary between wide limits.

It is thus a characteristic of the present invention to obtain the temperature compensation by providing a silicon diode in series with two resistors as a sub-circuit, and connecting the sub-circuit in parallel with the Zener diode. One of the two resistors in series with the silicon diode should be adjustable. A d.c. potential which is highly temperature compensated may then be obtained from the junction of these two resistors. In the exemplary embodiment shown, the sub-circuit consists of a resistor 43 and a further compound resistor 44 containing two parallel resistors 46 and 47, connected in series with a silicon diode 48. The two resistors 46 and 47 are made adjustable. Thus, the junction 49 of the two resistors 43 and 46, 47 yields a very precise constant potential which is temperature-compensated and which is derived from the Zener diode potential. By a further subdivision via the series circuit of resistors 51 and the resistor 52, which, in turn, consists of two parallel resistors 53 and 54, this temperature-compensated constant potential arrives at the junction 56 of the resistors 51 and 52 and, hence, goes to the base of transistor T11.

In the normal operational condition of the engine, the fuel-air mixture and, hence, the output potential $U_s$ of the λ-sensor, oscillates about this precisely adjusted value of the reference potential and, as may be easily seen, the output of the operational amplifier 12 jumps back and forth between the two extreme values which are fed to the integrator 3 via the conductor 13.

Thus, if at any time the internal combustion engine is receiving a lean fuel-air mixture, the λ-sensor generates a low potential so that the base of the transistor T9 carries a lower potential than the base of transistor T11. Accordingly, the output of the operational amplifier 12 is high since the sensor potential $U_s$ goes to the inverting input of the operational amplifier via the transistor T9. In the opposite case, when the engine receives a rich fuel-air mixture, the output of the operational amplifier is low. This output potential travels through the conductor 13 to the switching circuit including transistors T14 and T16 which, in turn, feed the integrating operational amplifier 17.

In the switching circuit, the bases of transistors T14 and T16 are joined via resistors 57 and 58 and the output conductor 13 of the operational amplifier 12 is joined to the junction of the two resistors. The emitter of transistor T14 is connected to the positive supply line via a resistor 59 while the emitter of transistor T16 is connected to the negative supply line via a resistor 61. The emitters are joined through two series resistors 62 and 63 while the junction 64 of these latter two resistors is connected, through a further resistor 66, to the non-inverting input of the subsequent operational amplifier 17. In a similar manner, the collectors of the two transistors T14 and T16 are joined via the series connection of resistor groups 67 and 68 and the junction 69 of these resistor groups is connected through a resistor 71 to the inverting input of the operational amplifier 17. The resistor groups 67 and 68 consist of the parallel connection of two adjustable resistors 72, 73 and 74, 76, respectively. The output control voltage from the operational amplifier 17 is obtained at the contact 77 after flowing through the resistor group 78 consisting of two parallel resistors 81 and 82 and through the diode 79. This circuit determines the operation of the closed loop control system during normal conditions. Depending on the output state of the operational amplifier 12, either the transistor T14 or the transistor T16 is conducting and a current of appropriate polarity is then fed to the non-inverting input of the operational amplifier 17 through the adjustable resistors 72, 73 74, and 76. This same current also flows to the capacitors 18 and 19 which are connected between the non-inverting input and the output of the operational amplifier 17. This circuit permits, according to a characteristic of the invention, that the speed of the changes of the rising and falling voltage at the output of the integrating operational amplifier 17 can be adjusted independently.

This permits the generation of different rise and fall speeds of the voltage at the output of the integrating operational amplifier which, accordingly, result in different speeds of alteration of the fuel-air mixture. That quality can be advantageously employed if the internal combustion engine is to be fed with a fuel-air mixture which is different from that which would correspond to the reference potential present at the circuit location 56.

The potential across the capacitors 18 and 19 depends on the switching state of the circuit. For example, if the output of the operational amplifier 12 is high, then the transistor T16 conducts and current flows from the positive supply line through the capacitors 18 and 19, the resistor 71, the resistor combination 68, and the collector-emitter path of the transistor T16 into the voltage divider formed by resistors 59, 63, 62 and 61. Thus, the output potential of the integrator consisting of the operational amplifier 17 and the capacitors 18 and 19 moves in the direction of a positive potential. If this potential is fed to the multiplying stage of an associated fuel injection system, it results therein in a supplementary charging current which will finally increase the length of the fuel injection control pulses $T_i$.

Certain special configurations of the basic circuitry which are necessary for the flawless operation and for the switchover from closed loop to open loop control and vice versa will now be explained in detail.

Firstly, the circuit includes a voltage compensation sub-circuit for the d.c. potential generated by the Zener diode Z41. Such a compensation is required because the Zener diode Z41 has a certain differential resistance so that the Zener diode potential changes with the battery voltage since the supply current for the Zener diode depends on the changing supply voltage. In order to compensate for this fact, a voltage signal which corresponds to the fluctuations of the supply voltage is taken from the junction of the two resistors 38 and 39 and is brought through a resistor 83 to the inverting input of the operational amplifier 12 which is also supplied with the signal from the λ-sensor. This has the effect that, when the supply voltage rises, the increase of the Zener diode potential also raises the reference signal slightly, but it is added via the high value resistor 83 to the λ-sensor's signal so that, on the average, the influence of the changing supply voltage is eliminated.

A further substantial characteristic of the present invention is the circuit which recognizes the operational readiness of the sensor and which includes the two timing circuits 4 and 6. Such a recognition of the operational state of the λ-sensor is required because, when the λ-sensor is located in the exhaust gas channel under cold conditions, it has a very high internal resistance which alone would suffice to generate a high voltage drop due to the base current of transistor T9 so that, under cold engine conditions, the sensor would simulate a rich mixture and the entire circuit would be urged to cause a leaning out of the mixture which is exactly contrary to what is required under cold engine conditions.

During normal operation of the system, the output of the operational amplifier 12 in the comparator circuit continuously alternates between a high and a low potential. However, if the λ-sensor is below its operational temperature, it simulates a rich mixture and the output of the operational amplifier 12 remains at a low potential for extended periods of time. Thus, it is the task of the first timing circuit 4, which includes the transistors T22, T23 and T24, to define a monitoring period during which the output of the operational amplifier 12 must normally alter its potential. If, on the other hand, the potential does not change during this pre-determined period of time, the timing circuit 4 and the subsequent second timing circuit 6, which will be described in detail below, engages the system and changes it over from closed loop operation to simple forward control. In other words, the timing circuit 6 turns off the integrator and delivers an output signal to the contact 77 which approximates an average setting but can, of course, be chosen at will. This is done in the following manner: The output potential at the operational amplifier 12, which is approximately zero for extended periods of time when the λ-sensor is cold or when the lines are broken, is transmitted to the base of transistor T22, preferably via a decoupling stage formed from a transistor T21. The collector of the transistor T21 is connected directly to the positive supply line while its base is connected through a diode 84 to the output of the operational amplifier 12. The base of transistor T21 is connected through a resistor 86 to its own emitter which, in turn, is connected via the series connection of two resistors 87 and 88 to ground. Thus, the transistor T21 operates as an emitter follower and the junction of resistors 87 and 88 is connected to the base of the first transistor T22 of the timing circuit 4 which, together with a further transistor T23 and a capacitor 89, forms a so-called Miller integrating circuit. In this circuit, the collector of transistor 22 is connected to the positive terminal via a resistor 91 while its emitter is connected via a resistor 92 to ground or to the negative potential supply. The emitter of transistor T23 is connected directly to ground while its base is connected directly to the emitter of the transistor T22 and its collector is connected to the positive supply line via a resistor 93. The integrating capacitor 89 is connected between the base of the transistor T22 and the collector of the transistor T23. The output of this Miller integrator is taken from the collector of the transistor T23 via a voltage divider including resistors 94 and 95 to a transistor T24 whose emitter is connected to ground while its collector is connected to the positive supply line via a resistor 96a. When the output potential from the operational amplifier 12 is low (high sensor potential $U_s$) the transistor 21 blocks and, if the transistors T22 and 23 also block, the timing capacitor 89 can exchange charge through the resistors 88 and 93 so that the collector of the transistor T23 becomes increasingly positive. The period of time after which the switching threshold for the transistor T24 is reached may be determined by choosing an appropriate value for the capacitor 89, the resistor 88 and the resistors 94 and 95 and, in the exemplary embodiment shown, may be of the order of 2–5 seconds. This period of time will be referred to below as the monitoring time and must further be so chosen that, during idling, when the entire system is subject to large dead times, the timing circuit definitely will not perform a switch to forward control. Furthermore, the monitoring time $T_u$ must be so chosen that the adapting range is only a fraction of the entire control range during this period while the control system still operates in closed loop mode.

As soon as the switching threshold of the transistor T24 has been reached, i.e., as soon as its base potential, as supplied by the voltage dividers 94 and 95, is sufficiently high, it begins to conduct and its collector potential is essentially that of the negative supply line. As an immediate consequence, the inverting input of the operational amplifier 17 is pulled in the direction of the negative potential but in any case lower than the fixed potential at the inverting input. Thus, the output voltage of the operational amplifier 17 rises and, with the aid of auxiliary circuitry, one may obtain an output signal which corresponds to the desired injection control time $T_i$ during forward control. This auxiliary circuitry consists in the present example of two parallel resistors 98 and 99 in series with a diode 101, the cathode of which is also connected to the collector of the transistor T24 while the other side is connected to the output of the operational amplifier 17, and a further resistor 102 which is connected between the output of the operational amplifier 17 and the positive potential. Thus the influence on the fuel injection time $T_i$ previously performed by the control voltage from the λ-sensor located in the exhaust line is thus eliminated from the control process and a switchover takes place to forward control until such time as the exhaust gas sensor is expected to generate proper, exact control signals.

Connected to the output of the first timer circuit, i.e., with the collector of transistor T24, via a diode 103 in series with a resistor 104, is a second timer circuit 6 whose construction is identical to the Miller integrator of the first timer circuit 4 which includes the transistors T22 and T23. For this reason, the basic construction of this circuit will not be dealt with; the timing capacitor in this circuit has the reference numeral 106 and it connects the base of transistor T25 with the collector of transistor T26. The collector of transistor T26 is connected through a resistor 107, not to the positive supply line, but to the emitter of a transistor T108 which will be discussed in more detail below and which supplies a substantially constant voltage to the line 109. This is necessary because the output voltage from the second timer circuit 6, taken from the collector of the transistor T26 via an adjustable resistor combination 109a consisting of two individual resistors 110 and 111 in parallel and a series diode 112, is directly transmitted through the line 113 to the base of the transistor T11 of the comparator circuit. This means that, during the forward control phase, i.e., the open loop control phase, the steadily rising potential at the collector T26 is used to continuously and time-dependently increase the input threshold of the comparator circuit via the trimmer resistors 110 and 111. In similar manner, after the open loop control phase is ended, there takes place a lowering of the input switching threshold by supplementary influence on the potential at the base of the transistor T11 which, as has already been mentioned, also receives the constant reference signal.

Under normal conditions, i.e., in the closed loop control phase, when the transistor T24 is blocked after the gradual lowering of the input threshold, the transistors T25 and T26 are so far over-biased that the diode 112 blocks and thus the residual voltage at the collector-emitter path of the transistor T26 and the resistor combination 109a has no influence on the input switching threshold.

The junction of diode 103 and the resistor 104 is connected to a voltage divider circuit comprising the resistors 114 and 115 which is disposed between the line 109 and the negative supply line. As may be seen, the stabilized voltage on the line 109 is derived from the Zener diode Z41 and is indirectly derived from the circuit point 42 through a resistor 116 which is connected to the base of the abovementioned transistor 108, which permits loading the voltage on the line 109. The transistor T108 is connected as an emitter follower and its collector is connected directly to the positive supply line while its emitter is connected to the line 109 as well as, via a series connection of two resistors 117 and 118 and a diode 119, to the output connection of the operational amplifier 12.

There is also provided a further sub-circuit which clusters around the transistor T121 in the base circuit of the transistor T9. Whenever the collector voltage of the transistor T24 changes toward negative values, it contains the information that the circuit has gone over into the forward or open loop control phase. The connecting line 122 controls the base of the transistor T121 through the series connection of a resistor 123 and a diode 124. The emitter of this transistor 121 is connected to the stabilized voltage on the line 109 and represents a switch in the sense that the voltage divider circuit comprising resistors 126 and 127 is energized. It should be noted that this circuit represents a variant of the potential shifting at the base of the transistor T11 via the second timer circuit 6 and may preferably be used as an alternative thereto. The junction of the two resistors 126 and 127 delivers a potential during the forward control phase which is taken via a relatively high value resistor 128 and a diode 129 to the base of the transistor T9 which also supplies current to the sensor 7. The voltage dividing ratio of the two resistors 126 and 127 is so chosen that the maximum permissible potential of the λ-sensor will not be exceeded (in the extreme case, diode 129 is without current) and, in this manner, the voltage across the λ-sensor 7 may be more precisely determined and controlled than would be possible with the aid of the less accurate base current flowing through the transistor T9. At the same time, the collector of transistor T121 increases the potential at the base of the transistor T11 via a connecting line 131 but it does so, in this case, without any temporal delay with the aid of the timer circuit 6 but rather immediately when the transistor T21 becomes conducting. This may also serve to raise the input switching threshold in an appropriate manner. During this event, current flows from the collector of the transistor T121 through an adjustable resistor combination comprising the parallel resistors 132 and 133 and a series diode 134 to the base of the transistor T11 and raises the potential there due to the voltage drop of this current across the resistor 52. The λ-sensor is subject to the condition that it must not be subjected to an excessive external voltage and this may happen if it is cold and has a very high internal resistance. The voltage divider sub-circuit of resistors 126 and 127 ensures that, no matter how great is the internal resistance of the sensor, the voltage across the sensor will not exceed a predetermined value. Any uncertainties which may be due to the base current of the transistor T9 are eliminated by the series connection of resistors 136 and 137 which connect the base of the transistor T9 to the negative supply line, the resistor 136 being adjustable. The circuit is so dimensioned that, when the system operates in the closed loop configuration with a normal reference potential at the transistor T11, the resistors 136 and 137 define a base current for the transistor T9 which is exactly the right magnitude for placing the comparator circuit at its switchover point. Thus the resistors 136 and 137 provide the base current required for the normal closed loop control phase. This is significant when using controllers and locations for the λ-sensors which cause the sensor to be subjected to lower temperatures, for example if the sensor disposed in positions where such relatively low temperatures predominate. The disposition of the resistors 136 and 137 permits locating the sensor in positions where it is subject to higher values of internal resistance.

The controller according to the invention further includes a sub-circuit associated with the integrator 3 and it is its purpose to cycle the entire control process with reference to the injection pulses $T_i$ or some other rpm-synchronous information so as to make the closed loop control process dependent on the aspirated air quantity. That sub-circuit includes the transistor T138 and its associated circuit components. The signal corresponding to the injection time $T_i$ or some other appropriate equivalent signal present at the connection 141 is supplied to the base of the transistor T138 via a resistor 139 and a diode 140. The emitter-collector path of the transistor 138 is connected in series with the resistor 142 to the emitters of the transistors T14 and T16. When the transistor T138 conducts, the transistors T14 and T16 are also turned on. However, since the emitter potential of these transistors T14 and T16 is almost as large as those occurring at the inverting and non-inverting inputs of the operational amplifier 17, no recharge current can flow through the resistors 71 and 67 and through the collector-emitter path of the transistor T14 or through the resistors 71 and 68 and the collector-emitter path of the transistor T16. Thus, there is no change of the output potential of the operational amplifier 17. A change of the integrator output and hence of the signal at the output point 77 of the circuit can take place only if the transistor T138 is blocked, which is the case during the injection time $T_i$. This kind of cycling of the control process is especially important during the idling of the engine because it prevents an rpm oscillation, i.e., a so-called idling seesaw.

The entire circuit is subject to the requirement that the closed loop control process does not have too large a response time constant because otherwise it will respond too late to any sensor signals. However, if the time constant of the control loop is too small, it may be too small for the condition of engine idling which brings the danger of causing oscillations of the whole control loop which includes the engine and the controller. The cycling causes the mean adjustment speed to be rpm and air throughput dependent and thus becomes slower so that the control deviation of the injection time $T_i$ remains small, even at idle, yet, when the rpm is high, the control process may respond sufficiently rapidly. By including the adjustable resistor 142 in the emitter-collector circuit of the transistor T138, the output voltage of the integrator may be adjusted even during the pause between injection pulses. Finally, there is provided a further possibility for the changeover from closed loop control to straight-forward control and this possibility may preferably be used when the associated internal combustion engine is operating at full load. In such a case, in the present exemplary embodiment, the contact 143 carries a positive signal and turns on a transistor T144. The emitter of the transistor T144 is connected directly to the negative supply line as is its base via the parallel connection of a capacitor 145, a resistor 146 and a diode 147. The signal from the full load switch travels from the contact 143 via a low pass circuit including a coil 148 and a grounded capacitor 194 and through a resistor 149 to the base of the transistor T144. The potential on the collector of transistor T144 is transmitted through the series connection of a diode 150 and a resistor 151 to the inverting input of the operational amplifier 17 in the integrating circuit so that the latter assumes a usable output potential which makes it possible, with the aid of the resistor combination including the parallel circuit of adjustable resistors 152 and 153 as well as the series diode 154, to adjust an output potential which is suitable for the full load operation in many internal combustion engines. This may sometimes be necessary because, depending on the type of internal combustion engine which is being regulated by the λ-sensor, an enrichment may be required during full load operation, to prevent overheating or for some other reason, and when the λ-sensor control is operative, the richer injection signals would be immediately canceled by the controller.

It is a further requirement that the system does not initiate closed loop control immediately at engine start-up but, rather, that it first switches to open loop forward control because it must be assumed that immediately after the engine start-up the conditions for correct functioning of the λ-sensor are not yet present.

For this purpose, a capacitor 155 of substantial value is connected to the base of transistor T22 and, after turn-on, this capacitor absorbs sufficient current so that the base of the transistor T22 appears to be short-circuited so that the transistors T22 and T23 remain blocked independently of any other circuit conditions. Accordingly, as has already been mentioned, the transistor T24, which is the switching element that determines forward control, is conducting and the system of FIG. 2 is connected to operate in the open loop control mode for a period of time.

In another embodiment of the invention, the same purpose previously achieved with the capacitor 155 may also be achieved by providing that the transistor T22 is kept blocked during the starting by a switching element 189 which remains conducting during the start and connects the base of the transistor T22 with the negative supply line via the diode 190. The switching element 189 may, for example, be a switch near the ignition starting switch or it may be a transistor controlled by the starter switch during engine starting. The resistor 191 in FIG. 2 is shown to indicate that the switching element 189 may also influence further functions within the total injection system, these functions being uncoupled by the presence of the diode 190.

A further external influence on the switching threshold for the comparator circuit takes place via the input contact 156 which is connected, via a low-pass filter circuit consisting of the coil 157 and a grounded capacitor 193 and two parallel adjustable resistors 158 and 159, to the base of the transistor T11. In this manner, the input threshold may be affected, for example by a full load switch, by the air flow rate meter, by a temperature sensor or the like, in the sense of engaging the control loop and adjusting it in the desired manner. It should be mentioned in this connection that the elements disposed between individual active circuit elements, for example adjustable parallel resistors, capacitors and appropriately connected diodes could be embodied in some other manner and that it is substantial only to obtain the desired functioning of the circuit by means of a basic circuit design. Accordingly, the details of the circuit which have already been described as well as those which are yet to be described are to be interpreted only in the sense of providing a more complete explanation without in any manner limiting the characteristics of the invention to these definite exemplary embodiments.

The output of the comparator circuit 1, i.e., the output of the operational amplifier 12, exhibits a genuine multivibrator behavior since there exists a feed back connection to the non-inverting input of the operational amplifier via the resistor 161 which is connected to the junction of the above-mentioned resistors 117 and 118. These latter two resistors form a voltage divider which is supplied by the stabilized voltage on line 109 so as to make the feedback factor independent of the magnitude of the supply voltage.

After the engine has operated for some time and the λ-sensor begins to warm up, its internal resistance decreases and the circuit switches over automatically from the already described forward control to a genuine closed loop control because the voltage drop across the internal resistance of the sensor becomes lower and lower until finally, the output of the operational amplifier 12 shifts to the high potential value. At that time, the circuit recognizes that the sensor is heated up sufficiently and that from now on the switchover to closed loop control may take place. This switchover takes place at a time depending on the magnitude of the resistor 87 through which the output voltage from the operational amplifier 12 reaches the Miller integrator T22, T23 which then integrates in the opposite direction. The switchover can be relatively rapid, leading to immediate turn-off of the switch formed by transistor T121, thereby interrupting the supplementary current supply for the λ-sensor and turning off the raising of the threshold voltage at the transistor T11 via the conductor 113. If the switchover takes place via the second Miller integrator T25, T26, it may occur gradually since that integrator then also integrates first in the opposite direction.

Figure 3:
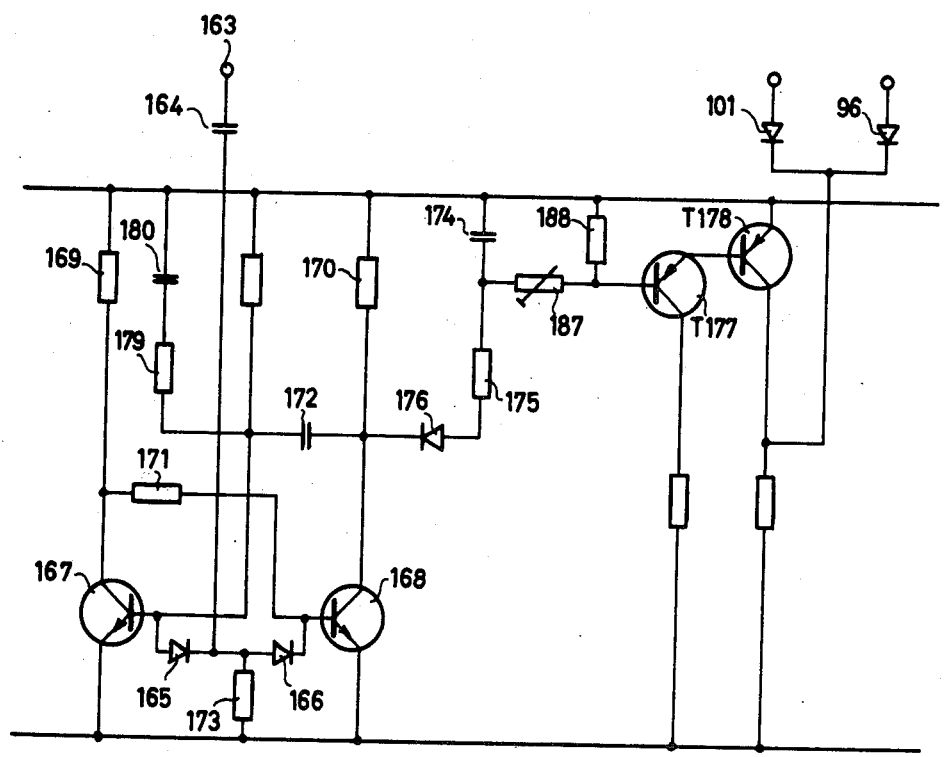
FIG. 3 shows a circuit diagram of a variant timing circuit.

In a further embodiment of the invention, the first timing circuit 4 is embodied as a monostable multivibrator shown in FIG. 3. The input contact 163 of the circuit of FIG. 3 is connected to the output of the operational amplifier 12. The output signal travels via a capacitor 164 and two diodes 165 and 166 to the two base electrodes of the transistors 167 and 168 which form the monostable multivibrator. The emitters of these transistors are directly connected to ground and their collectors are connected to the positive supply line via resistors 169 and 170, respectively. In the usual manner, the feedback connections consist of a resistor 171 and a capacitor 172, respectively. As may be seen from the circuit, the monostable multivibrator may be triggered by positive and negative edges coming from the output of the comparator circuit so that this circuit can also recognize a shortcircuiting of the λ-sensor. The input signal is differentiated by the already mentioned capacitor 164 and a resistor 173 connected between the two diodes 165 and 166. Under normal conditions, the transistor T167 conducts while the transistor 168 is blocked. In order to examine the manner of operation, let it be assumed that the system starts at a point in time at which the output pulse of the comparator circuit has swiched the monostable multivibrator into its unstable state, i.e., while the transistor T168 is conducting. During this unstable period, the capacitor 174 is charged to a negative potential through the resistor 175, the diode 176 and the collector-emitter path of the transistor 168, and the subsequent two transistors T177 and T178 are conducting. Under these conditions, the collector of the transistor T178 experiences a substantially positive potential so that the diodes 96 and 101 are blocked and the operation of the integrator is not affected.

When the time constant of the monostable multivibrator elapses, it returns to its stable state and the transistor 168 blocks. Thus, the capacitor 174 discharges through the resistor 187 and the base-emitter path of the transistors T177 and T178 with which the resistor 188 is connected in parallel, at a time constant which determines the duration of the monitoring time $T_u$ for recognizing the state of operation of the λ-sensor. If, during this time, there is no further output pulse from the comparator circuit, the voltage at the capacitor 174 drops so low that the Darlington circuit T177, T178 is no longer held conducting and the collector potential of the transistor 178 drops accordingly. As already mentioned the diodes 96 and 101 then permit a switchover to open loop forward control. The series connection of a resistor 179 and a capacitor 180 to the base of the transistor T167 insure that, when the ignition is turned on, a switchover occurs from closed loop to open loop control.

Figure 4A:
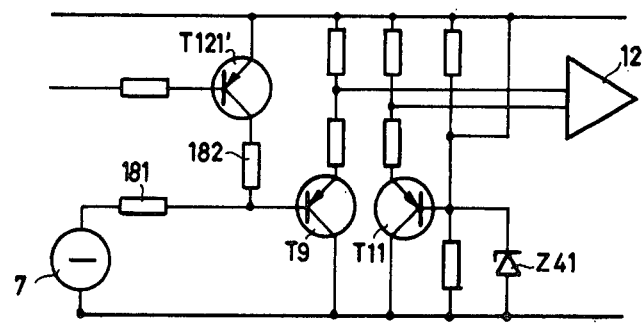
FIGS. 4a, 4b, 4c are variants of the circuit shown in FIG. 2.
Figure 4B:
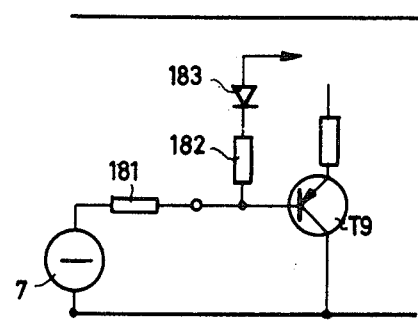
Figure 4C:
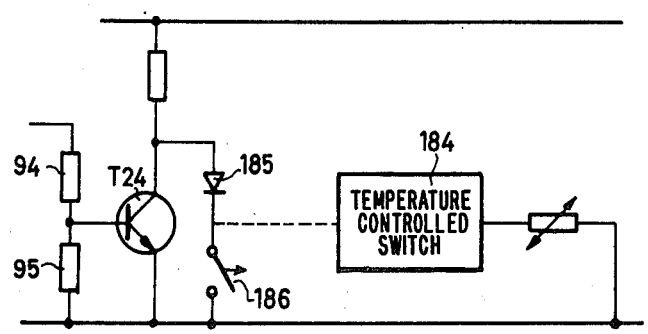

FIGS. 4a, 4b and 4c illustrate further variants of the basic circuitry. For example, the external current which causes a voltage drop across the internal resistance 181 of the λ-sensor may be obtained during forward control by a transistor T121' whose collector is connected directly to the λ-sensor via resistor 182 so that the voltage divider circuit 126, 127 and the high value resistor 128 may be dispensed with. In this case, the base of the transistor 121 is also controlled by the collector of the transistor T24.

The partial circuit illustrated in FIG. 4b shows how the internal resistance 181 of the λ-sensor may be supplied with a variably increasing current which flows through the resistor 182 and a diode 183 from the collector of the transistor T26 to the sensor.

Alternatively, it is also possible to make the onset of closed loop control dependent on the coolant temperature of the engine, for example by providing a temperature switch 184 in FIG. 4c which acts through a diode 185 on the collector potential of the transistor T24. Alternatively, there may be provided a mechanically controlled external temperature switch 186 which acts in a similar manner. In both cases, the collector potential of the transistor T24 is changed in the desired manner and the transistor thus switches over to open loop control.

It has already been mentioned that, when the forward control phase is terminated and the switchover takes place to closed loop control, the input threshold is lowered by additional influence on the potential at the base of the transistor T11. This is performed by supplying a changing, i.e., decreasing, threshold voltage from the Miller integrator of the transistors T25 and T26 through the line 113.

In order to improve the understanding of the mechanisms which play a role in closed loop control, the behavior of the oxygen or λ-sensor will be explained in greater detail with the aid of FIGS. 5a and 5b. When this λ-sensor is in operational condition, i.e., when is has been warmed up to its proper operating temperature and if one side of this sensor is exposed to gases resulting from an alternating rich and lean mixture, then its output potential, depending on the temperature, changes from approximately 100 mV for a lean mixture to approximately 900 mV for a rich mixture. However, this is true only for the condition beginning approximately with time $T_u$ in the diagrams of FIGS. 5a and 6a. Immediately after the start-up of an internal combustion engine or while the sensor is cold which corresponds to a time t approximately $t_1$, the output voltages from the λ-sensor are not usable for a control loop. Thus, as has already been explained in detail above, the closed loop control process is not turned on and the entire system operates merely on direct control.

FIG. 5b is an equivalent circuit diagram of the λ-sensor which shows the internal resistance $R_{is}$ as well as the emf $U_0$; the delivered voltage $U_0$ is highly temperature dependent and is indicated qualitatively in FIG. 5a. This means that the internal resistance $R_{is}$ of the oxygen sensor in the cold state is extraordinarily high and drops sharply when the sensor comes near its normal operating temperature which is approximately 250° C. On the other hand, the emf of the λ-sensor is low at low temperatures and gradually rises and branches off into the two limiting values $U_{s1}$ and $U_{s2}$ which are the curves corresponding to the extreme values of the λ-voltage when rich and lean mixtures are used, respectively.

As has already been mentioned, when the λ-sensor is first used, it is supplied with a switching current (to be further discussed below) and the result is thus a voltage as shown in the curve $U_{sk}$ of FIG. 5a which finally divides into two limiting branches between which the actual λ-sensor voltage oscillates depending on the behavior of the entire control system. Because of the very high internal resistance of the λ-sensor when cold and due to the switching current supplied by the circuit, the λ-sensor exhibits a very high voltage at low temperatures and, during the heating of the λ-sensor, the potential supplied is gradually decreased beginning with a high initial value.

It has already been mentioned that the output voltage of the λ-sensor is treated as the actual value of the controlled system and is supplied to the inverting input of the operational amplifier 12 which acts as a comparator, while the reference voltage or the command value with which the sensor voltage is compared and which will be referred to as a threshold value is supplied to the other input of the comparator 12 via the transistor 11 whose base receives the changing threshold potential from the output of the timing circuit 6. When the sensor is cold ($t < t_1$), the closed loop feed back control is not used and the threshold value is approximately 1.1 V as may be seen in FIG. 6a, but may, of course, be adjusted at will to any value below the output voltage of any particular λ-sensor. At the time $t_1$ this threshold is crossed in the downward direction for the first time (if the mixture was lean during the open loop control phase) and the closed loop control is now switched on on the basis of the changing output potential of the comparator 12. However, it will be seen that the closed loop control can operate properly only if the threshold at the transistor T11 is always greater than the sensor voltage $U_s$ for a lean mixture, i.e., when, as in the diagram of FIG. 6a, the curve I always lies within the two branches $U_{s1}$ and $U_{s2}$ so that the comparator circuit will be enabled to react to the voltage fluctuations of the λ-sensor which are due to the changing mixtures. If the threshold value after the time $t_1$ in FIG. 6a is to remain at all times within the extreme value curves, it must decrease slowly up to the time $t_2$ to that value which is desired during a fully heated, i.e., fully operational sensor, and which would then remain substantially constant and this value may be, for example 350 mV. Generally speaking, the desired constant threshold is a point on the curve of the λ-sensor voltage which would not change even if the sensor ages and would remain substantially constant for a long time. Since, in unfavorable cases, for example after the start, the time period $t_s$–$t_1$ may extend over several minutes, a preferred exemplary embodiment of the invention provides the reduction of the threshold with the aid of the Miller integrator, operating as a pure timing circuit and including the transistors T25 and T26 so that a control loop causes this threshold voltage to decrease more slowly and permits it to be lowered to low values only when the λ-control loop itself is operating in the direction of a rich mixture. This insures that the threshold can never remain for extended periods of time below the curve $U_{s2}$ for a lean mixture because, in that case, the threshold adjustment itself is interrupted, as is shown clearly in FIG. 6a, and the system delivers a constant threshold until the λ-sensor again indicates a lean mixture, even during warm-up operation.

According to a preferred embodiment of the present invention, the controlled threshold adjustment is performed be engaging the above-described second timing circuit in such a manner that the threshold adjustment is possible only if certain operational conditions actually prevail, namely that the λ-sensor itself indicates a lean mixture so that its output voltage is moving downwardly along the lower limiting curve $U_{s2}$ and that the similarly downwardly moving and changing threshold cannot cross over the sensor potential when it remains at its lower threshold. If, however, the threshold value is sharply lowered below the curve for a lean mixture, then this lowering is immediately arrested because the control system then signals a rich mixture and blocks the second timing circuit.

Figure 7:
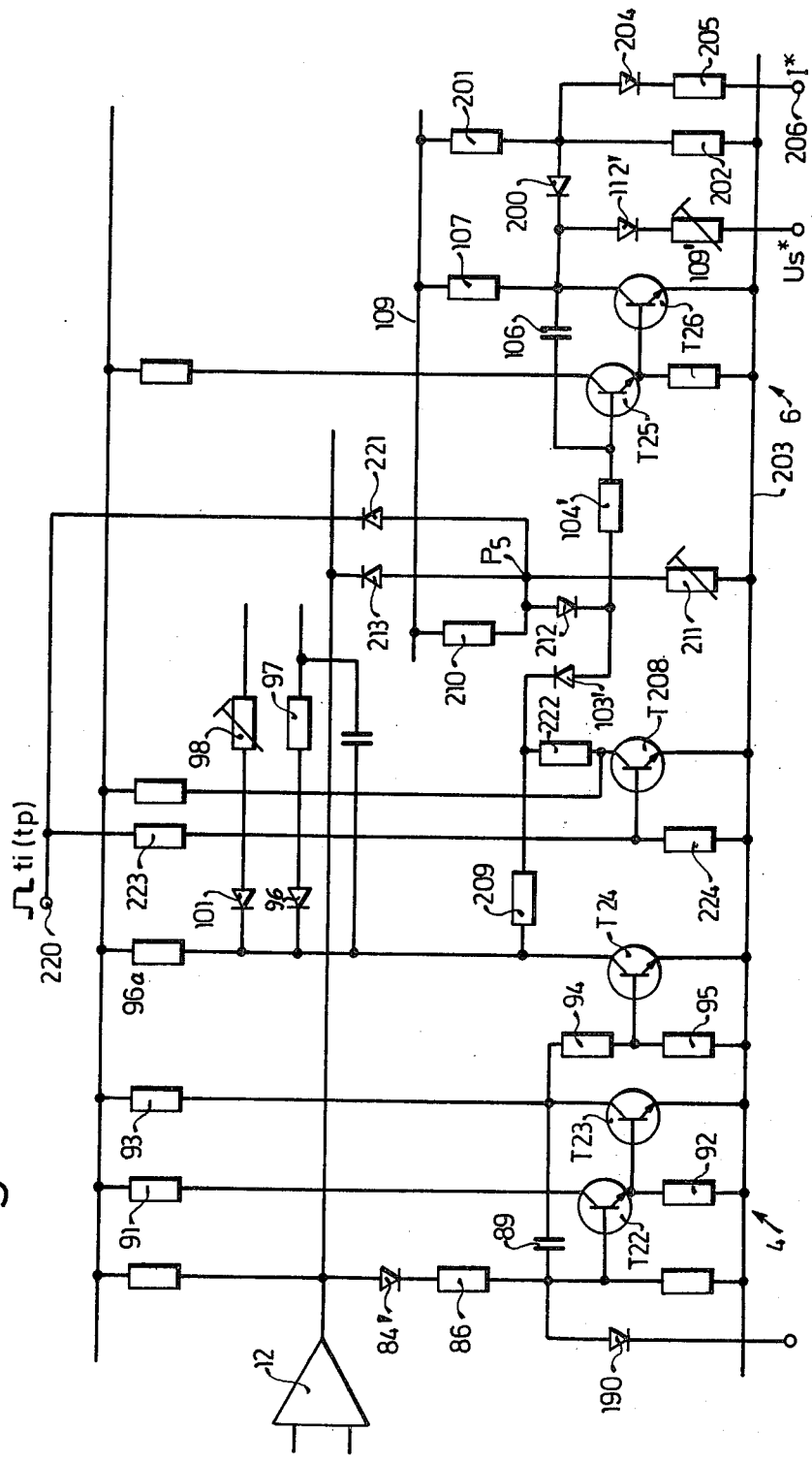
FIG. 7 is a circuit diagram of an exemplary embodiment for obtaining a graduated threshold voltage.

FIG. 7 is a circuit diagram of a first exemplary embodiment for the threshold adjustment circuit which uses a feedback control loop. Any circuit elements which were present in FIGS. 2a and 2b and which perform the same function have the same reference numerals. Of substantial importance in the representation of FIG. 7 is the circuit point $P_5$ in the base circuit of the transistor T25 which belongs to the second timing circuit and which, together with the transistor T26, forms a Miller integrator whose collector output potential is decisive for the threshold voltage adjustment and also for the current I* delivered by the circuit to the sensor. In simplified representation given here merely for the better elucidation, the output circuit of the Miller integrator, including the transistors T25 and T26, is so chosen that the threshold voltage $U_s^*$ is generated by a series connection of a diode 112' and an adjustable resistor 109' and, depending on circuit conditions, is delivered via the already described connection 113 to the transistor T11. At the same time, the collector of transistor T26 is connected via a diode 200 to the junction of a voltage divider circuit consisting of the resistors 201 and 202 which are connected between ground or the negative line 203 and the line 109. This junction point communicates through a further diode 204 and an adjustable resistor 205 with an output contact 206 which delivers the current I* generated by the circuit which may serve to supply the λ-sensor in order to obtain the above-described output potential behavior.

The circuit of FIG. 7 includes a supplementary transistor T208 and some associated circuit elements which will not be further discussed for the time being in this general discussion of the function and operation of the circuit.

Figure 2B:
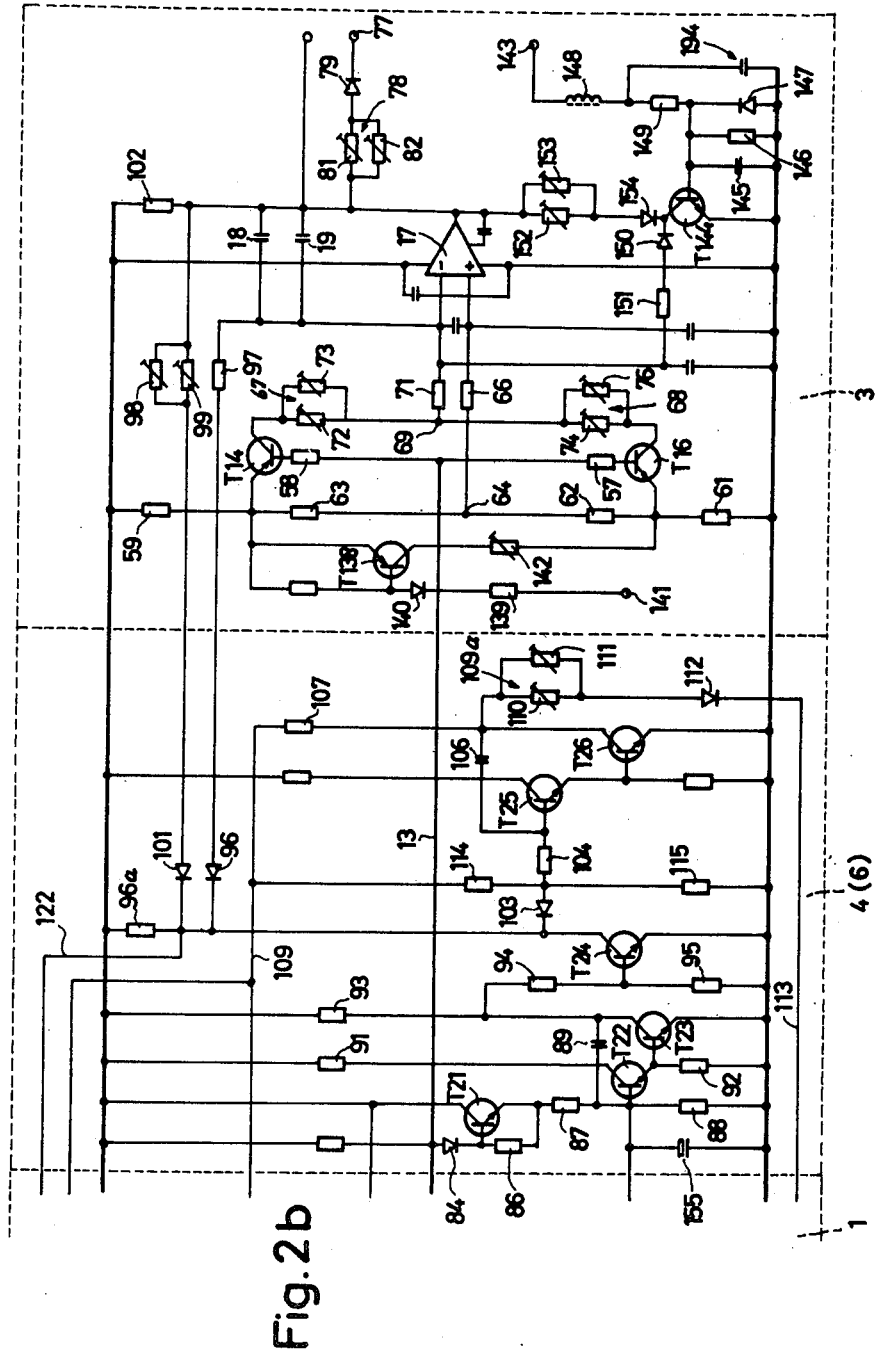

The collector of transistor T24 is connected via a resistor 209 in series with a diode 103' roughly corresponding to the diode 103 in FIG. 2b, and further in series with a resistor 104', to the base of the transistor T25. This connection provides the above-mentioned influence of the first timing circuit on the second timing circuit. The base circuit of the transistor T25 also includes a subcircuit which takes care of blocking or releasing this timing circuit and consists of a voltage divider including resistors 210 and 211, either of which may be adjustable, and which are connected between the negative supply line and the connector 109 which carries positive potential. The junction point P5 of the voltage divider circuit is connected through a diode 212 to the junction of the anode of diode 103' and the resistor 104'. The junction point P5 is further connected with a diode 213 whose cathode is connected to the output of the comparator 12 and is thus controlled by its output potential which, as has already been described, jumps back and forth between two voltages which may be referred to as plus and minus voltages and which, therefore, places the diode 213 in conductive or non-conductive condition.

Figure 9:
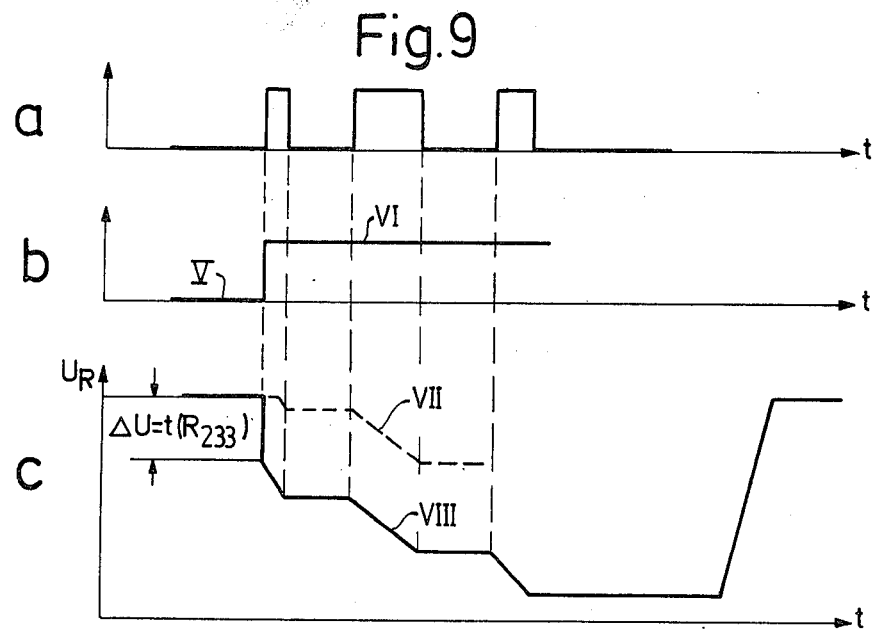
FIG. 9 is a set of diagrams showing the output voltages of the threshold switch (FIG. 9a) the output voltage of the switching circuit from forward control to closed loop control (FIG. 9b) and the changes in the threshold voltage as related to the switching of the threshold switch in two different variants.

In the further discussion of the circuit shown in FIG. 7, it will be assumed that the sensor voltage $U_s$, which is shown dashed in FIG. 6a and which moves abruptly between its two extreme values depending on the type of mixture supplied to the engine, falls below the command value or the threshold voltage for the first time approximately at the time $t_1$, i.e., the λ-sensor shows a lean mixture. Accordingly, the output of the comparator 12 jumps to plus voltage, the diode 84' becomes conducting and the first timer circuit 4 changes its output potential at the collector of the transistor T23 in the direction of negative values so that, after a short time, required by the Miller integrator for exchanging charge, the subsequent transistor T24 is blocked and the entire system changes over from open loop forward control to closed loop feedback control which may be seen especially clearly from FIGS. 9a and 9b. FIG. 9a shows the output potential of the threshold switch or the comparator 12, and FIG. 9b shows the output potential of the transistor T24 which jumps from the open loop region V to the closed loop region VI; the diodes 101 and 96 are thereby blocked, as is the diode 103' via the resistor 209 because, due to the resistor 96a, the collector of transistor T24 experiences substantially positive potential. At this point in time, i.e., when the closed loop control begins and a lean mixture is indicated by the λ-sensor, corresponding with a renewed positive output potential of the comparator 12, there takes place, as expected, a decrease of the threshold potential corresponding to the first threshold decreasing phase A in FIG. 6a. Because of the positive potential at the output of the comparator 12, the diode 213 also blocks, so that the junction point P5 is free and the voltage thereon is a positive voltage determined by the ratio of resistors 210 and 211. This predetermined positive voltage is transmitted through the diode 212 and the resistor 104 to the input of the second Miller integrator at the base of the transistor T25. As already explained above, this leads to a lowering of the output potential of the Miller integrator (the collector voltage of transistor T26) and hence to a change of the threshold voltage $U_s^*$. During this time, the sensor potential also drops, its magnitude is determined roughly by the extreme value curve $U_{s2}$ corresponding to a lean mixture. At the same time, the λ-control loop, as shown in FIG. 6b, regulates in the direction of a rich mixture and the curve in FIG. 6b may be said to represent, for example, the integrator output potential, possibly at the output contact 77 in FIG. 2b. Thus, after a time, the output potential of the λ-sensor again changes abruptly and, because of the adjustment effect of the integrator output, goes to its output voltage corresponding to the curve $U_{s1}$ for a rich mixture. As intended, during this time period the threshold voltge of the curve I in FIG. 6a must no longer change which is guaranteed in the practical circuit example of FIG. 7 by the fact that the output of the comparator 12 is at low potential (because the λ-sensor shows a rich mixture), the diode 213 conducts and lowers the junction point potential P5 so far that the diode 212 blocks. Thus, the positive potential at the input of the Miller integrator in the timer circuit 6 disappears, but, for the time being, no negative potential reaches this input via the diode 103', because the transistor T24 remains blocked and keeps the closed loop control intact until the first timer circuit 4 passes through its predetermined monitoring time $T_u$. Accordingly, the input of the Miller integrator in the timer circuit 6 is insulated from any voltage and its output voltage remains constant corresponding to the time phase B in FIG. 6a. It may be seen that, as soon as the diode 213 blocks again, the Miller integrator consisting of transistors T25 and T26 is released again and its output voltage further decreases. This state of affairs occurs when the λ-sensor again indicates a lean mixture. The time constants which govern these oscillatory processes are relatively large and may be as large as several seconds; however, they are lower than the monitoring time $T_u$ of the first timer circuit so that no switchover to open loop control will take place. If such a switchover were to take place then, as has already been explained, the threshold voltage would not only fail to decrease further, but rather would experience an increase.

It will be seen that in the circuit described, if the threshold voltage falls below the curve $U_{s2}$ corresponding to a lean mixture, then its decrease will be immediately stopped because the control loop will then receive a signal for a rich mixture and the output voltage of the comparator or threshold switch 12 changes to a negative potential, the diode 213 becomes conducting and the Miller integrator in the second timer circuit 6 is blocked.

The circuit thus insures that the threshold is lowered only after the further heating of the λ-sensor and the curve $U_{s2}$ related to a lean mixture is just below the adjusted threshold value. Only after that time is the timer circuit 6 released again.

If this λ-control system is associated with an electronic fuel injection system which generates discrete injection pulses for each stroke with rpm and throttle valve control, then it is possible to adjust the speed with which the threshold voltage is lowered (corresponding to curve I in FIG. 6a) as a function of load, i.e., the timer circuit 6 is released only during the time duration of the injection pulses. This possibility is given in addition to the already described operation of a step-wise decrease. A load-dependent speed of lowering the threshold voltage also corresponds to the practical requirements because, when the engine load is small, the time period $t_2-t_1$ is greater than when the load is high.

In order to obtain such a supplementary adaptation to the load of the engine, the circuit of FIG. 7 is supplied with the fuel injection pulse or an appropriate preliminary pulse at an input contact 220. The duration of this fuel injection pulse $T_i$ indicates the quantity of fuel supplied to the engine per stroke and thus is also a measure of the load to which the engine is subjected. Thus, when the fuel injection pulse $T_i$ is present, the contact 220 experiences a positive potential whereas, otherwise, the contact is at the negative potential. The positive potential passes a diode 221 and also reaches the junction point P5 so that it may easily be seen that the diode 221 is blocked during the applied fuel injection pulse while, if no pulse $T_i$ is present, it is conducting and the potential drop caused thereby at the point P5 leads to a blockage of the diode 212. This means that, even during a decrease phase A, A' or A" according to FIG. 6a, the Miller integrator of the timer circuit 6 is released and its output potential cannot drop any further. However, this change takes place in substantially smaller time periods, so that such a modified threshold decrease cannot be inserted in the curves of FIG. 6a.

In addition to the connection of the junction point P5 with the input contact 220 through the diode 221, or instead thereof, i.e., when there is no diode 221, there may be provided a transistor T208 whose collector is connected through a resistor 222 with the junction point of the resistor 209 and the diode 103'. The emitter of the transistor 208 is connected to the negative line 203 and its base is supplied with the fuel injection pulses $T_i$ through a resistor 223 from the input contact 220. The base of the transistor 208 is also connected through a resistor 224 to the negative supply line. As may be seen, when no injection pulse is present, the transistor 208 blocks and does not play any role. If a fuel injection pulse is present, the transistor 208 conducts and lowers the potential at the cathode of the diode 103' until it conducts and, in this case, there may in fact be a short term increase of the output potential of the second timer circuit 6. Such a rhythmic cycling of the change in the threshold voltage in time with the fuel injection pulses $T_i$ which are generated by the fuel injection system yields an even more sensitive adaptation to the operational condition of each internal combustion engine. This kind of cycling may take place exclusively by engaging the potential at the point P5 via the diode 221, or exclusively by using the transistor 208 which is switched by the fuel injection pulses $T_i$, or, possibly, by using both of these circuits together.

Regarding the current I* which is generated by the circuit and fed to the λ-sensor to simulate a predetermined λ-sensor output voltage when the sensor is cold, it should be mentioned that, prior to the threshold voltage reaching a predetermined level or value, the current I* which is supplied to the λ-sensor is determined exclusively by the ratio of the values of the resistors 201 and 202 and the adjustment of the resistor 205. This is so because, at first, a certain (negative) potential corresponding to the output of the second Miller integrator must be obtained at the cathode of the diode 200 before that diode becomes conducting, after which the voltage divider potential of resistors 201 and 202 which determines the current I*, and the output of the Miller integrator or the second timer circuit 6 begins to change.

Furthermore, it will be noted that, during vehicle operation, for example by sustained over-running, there may occur a sensor state which corresponds to a cold sensor and requires a switchover to open loop control. Such an event would invoke all of the previously described conditions as well as the graduated, step-wise threshold voltage change. Thus, if an internal combustion engine using λ-control is used, the features of the present invention are effective at other times than the initial start-up of the cold engine.

Figure 8:
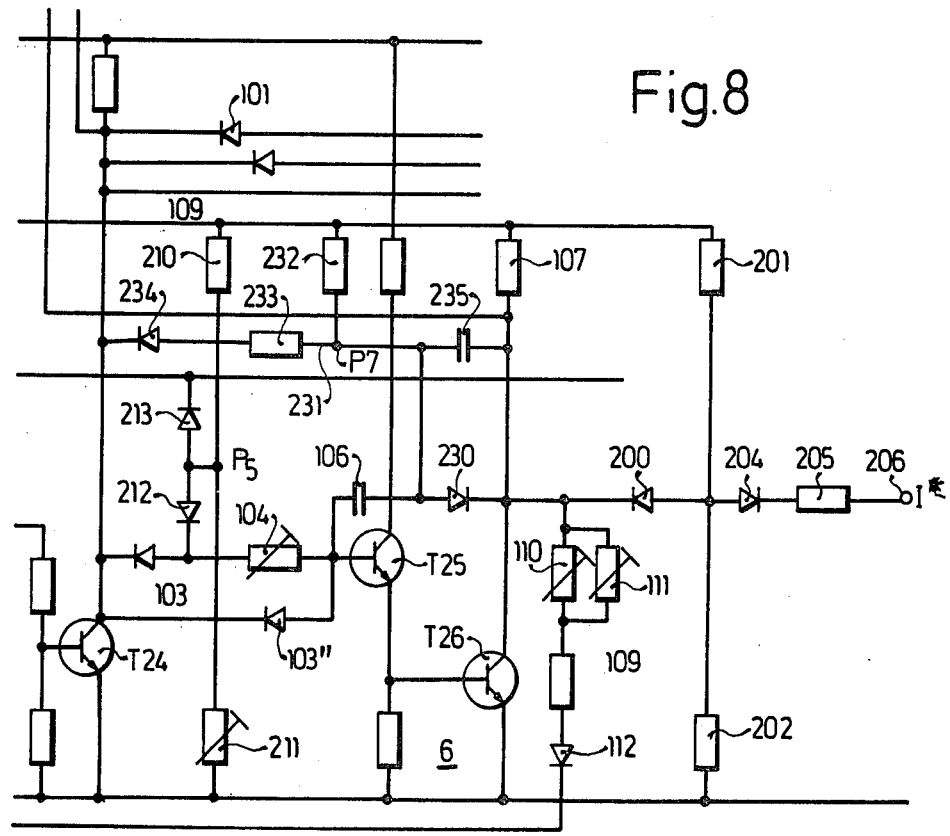
FIG. 8 is a circuit diagram of a variant circuit especially for modern λ-sensors.

FIG. 8 illustrates a partial diagram of a further modification which is very suitable for use especially in λ or oxygen sensors of the most modern type, i.e., so-called yttrium sensors. In these yttrium sensors, the sensor voltage $U_s$ changes much more abruptly as a function of temperature than in other types. Thus, in some cases, during the change of the threshold and its lowering after the onset of closed loop control, the previously explained threshold lowering does not exactly correspond to the prevailing temperature so that it may happen, substantially immediately after the closed loop action of the integrator, that the latter runs in the direction of a rich mixture for several seconds because the threshold value may lie above the extreme value curve $U_{s1}$, which indicates a rich mixture independently of the actual condition of the λ-sensor.

Thus, in a further embodiment of the circuit of FIG. 7 or that of FIGS. 2a and 2b, it is provided that, after the onset of closed loop control, the threshold at first makes a jump by a predetermined amount in the direction of a lower voltage, i.e., in the direction of negative potential. Only thereafter does the closed loop control process, explained in detail with respect to FIG. 7, become effective.

This jump of the threshold at the onset of closed loop control may be provided by the particularly suitable circuit modification illustrated in FIG. 8 which only shows the switching transistor T24 controlled by the first timer circuit 4, the second timer circuit 6 (Miller integrator of transistors T25 and T26) and some associated circuit elements. The subsequent circuit elements are contained in the circuits which are explained in detail above. Circuit elements which perform the same function retain the same reference numerals as previously.

The above discussion has made it clear that, prior to the onset of closed loop control, the output of the Miller integrator is fully at positive potential at the collector of the transistor 26. In the exemplary embodiment shown, a diode 230 is connected in series with the integrating capacitor 106 of the second Miller integrator in such a manner that its cathode is connected with the collector of the transistor T26. The junction of the diode 230 and the capacitor 106 is connected through a line 231 to a further circuit junction P7 formed by the junction of two voltage divider resistors 232 and 233 connected to the line 109 carrying positive constant voltage and, through a diode 234, with the collector of transistor T24, respectively. The voltage divider circuit 232, 233 and the diode 234 are so chosen that, relative to the collector of the transistor T26, the circuit point P7 assumes a negative potential, i.e., the diode 230 is blocked. Thus, there is a voltage difference as between the collector of transistor T26 and its associated capacitor 106 which is charged to the voltage divider potential from the resistors 232 and 233. This potential is maintained by the voltage divider circuit as long as the diode 234 remains conducting, because the transistor T24 conducts. Once the switchover from forward control to closed loop control takes place and the transistor T24 blocks, the input voltage of the Miller integrator including transistors T25 and T26 becomes positive and, at the same time, the lower point of the voltage divider 232, 233 is freed due to blockage of the diode 234. This condition is sensed by the Miller integrator including transistors T25 and T26 and it reacts with an abrupt shift of its output potential because the diode 230 becomes conducting and the potential at the collector of the transistor T26 (corresponding to the threshold potential) drops abruptly to that defined by the voltage divider circuit of resistors 232 and 233 (to which the capacitor 106 is charged) plus the voltage across the diode 230. Alternatively, the input circuit of the transistor T25 is so chosen that the series diode 103, acting now as a diode 103″, connects the collector of transistor T24 with the base of transistor T25.

The time behavior of the voltage jump may be seen in the diagram of FIG. 9c in which the upper dashed curve VII corresponds to the adjustment possibility of the threshold corresponding to the representation in FIG. 7 while the curve VIII incorporates the abrupt lowering by a voltage ΔU at the onset of the closed loop control process. As may easily be seen, the voltage ΔU is a function of the resistor 233; the smaller this resistor, the greater is the voltage jump ΔU which the Miller integrator must perform at the onset of closed loop control.

Finally, the junction of the capacitor 106 and the diode 230 is connected through a further capacitor 235 with the collector of the transistor T26 and thus bridges the diode 230; this capacitor 235 serves to improve the noise immunity.

It should be understood that the foregoing describes preferred exemplary embodiments of the invention and that many other variants and embodiments are possible within the spirit and scope of the invention, the scope being defined by the appended claims.

What is claimed is:

1. A method of controlling the operation of a fuel management system of an internal combustion engine, said system including fuel allocation means, control means for generating fuel control signals related to engine rpm and air flow rate, and also including an oxygen sensor for generating a sensor signal related to a fuel-air ratio of a fuel-air mixture supplied to the engine which is fed back in a closed loop to said control means, comprising the steps of:
generating a single variable reference signal;
comparing said reference signal with said sensor signal;
continuously detecting the occurrence of sensor signal changes in a time interval;
automatically disabling the closed-loop control of said system based on feedback of said sensor signal when no sensor signal changes are detected in said time interval indicating a malfunction of said oxygen sensor and substituting therefor an open-loop control based on engine rpm and air flow rate;
automatically altering the magnitude of said reference signal by a predetermined value;
re-engaging the closed-loop control of said system based on feedback of said sensor signal when sensor signal changes are again detected indicating an operative state of said oxygen sensor; and
thereafter returning the magnitude of said reference signal gradually to a normal level appropriate for an operative oxygen sensor whereby said reference signal is maintained at a value which is bracketed by said sensor signal, to effect said closed-loop control based on feedback of said sensor signals.

2. A method as defined by claim 1, wherein, when said closed-loop control is interrupted, said reference signal is increased by a predetermined value and a current provided to said oxygen sensor is limited in predetermined manner.

3. A method as defined by claim 2, wherein said fuel management system is a pulse controlled fuel injection system and wherein the closed-loop control of the duration of fuel injection pulses is switched over to predetermined pulse duration values during engine start-up, during full load engine operation and when the coolant of said engine is at low temperatures.

4. A method as defined by claim 1, wherein, after switchover to closed-loop control, said reference signal is decreased in a controlled manner so as to always remain greater than said sensor signal.

5. A method as defined by claim 4, wherein the reference signal is lowered only if said sensor signal indicates a lean fuel-air mixture.

6. A method as defined by claim 4, wherein said fuel management system is a pulse controlled fuel injection system and wherein the change of the reference signal is adapted to the changing sensor signal at the onset of closed-loop control in load-dependent manner by providing that the lowering of the reference signal is effected as a function of the duration of the injection pulses of the engine in stepwise manner.

7. A method as defined by claim 1, wherein the lowering of said reference signal is made dependent on the temperature behavior of said oxygen sensor by providing that it is abruptly lowered immediately after the onset of closed-loop control.

8. An apparatus for controlling the operation of a fuel management system of an internal combustion engine, said system including fuel allocation means and means for generating signals related to engine rpm and air flow rate and further including an oxygen sensor for generating a sensor signal related to exhaust gas composition which is fed back in a closed loop to said signal generating means, said sensor signal normally switching between a relatively high value indicating a rich fuel-air mixture and a relatively low value indicating a lean fuel-air mixture, said apparatus comprising:
a comparator means for providing and comparing a reference signal with said sensor signal from said oxygen sensor, said comparator means generating an output signal having a first value when the sensor signal is lower than the reference signal and having a second value when the sensor signal is higher than the reference signal;
an integrating means, connected to receive the output signal from said comparator means, for supplying a fuel control signal to said fuel management system;
a first timer means, having an input connected to receive said comparator means output signal and an output, for switching said signal generating means between closed loop and open loop control, said first timer means generating a timer output signal at its output to be applied to said integrating means to terminate integration and to supply a constant fuel control signal to said fuel management system after a period of time during which the output signal of said comparator means remains approximately constant, indicating an oxygen sensor malfunction; and
a second timer means, controlled by said first timer means, having an input connected to said first timer means input and having an output, for raising said reference signal subsequent to the occurrence of an oxygen sensor malfunction and gradually lowering it when the oxygen sensor operates properly.

9. An apparatus as defined by claim 8, including an input terminal (8) for receiving said sensor signal and an input circuit from said input terminal to said comparator means which includes a low pass filter including a coil (27) and a grounded capacitor (28) for blocking high frequency signal components.

10. An apparatus as defined by claim 8, wherein said first and second timer means include:
 a differentiating circuit (163, 173);
 a capacitor (174);
 a monostable multivibrator (167, 168) having an input and an output switched between a normal state and an unstable state, the output signal of said comparator means being fed via said differentiating circuit (163, 173) to the input of said multivibrator and said capacitor (174) being connected to the output of said multivibrator (167, 168) wherein, during the unstable state of said monostable multivibrator, said capacitor (174) is charged;
 a Darlington circuit having an input and an output switched between a conducting state and a non-conducting state, the capacitor (174) being connected to the input of the Darlington circuit to hold the output of the Darlington circuit in its conducting state when the capacitor (174) is charged, wherein during the unstable state of said monostable multivibrator, the capacitor (174) is charged to switch and hold the Darlington circuit in the conducting state and wherein during the normal state of the monostable multivibrator the capacitor (174) is discharged at a predetermined time constant to thereafter switch the Darlington circuit to the non-conducting state;
 wherein the output of the Darlington circuit is connected with diodes which control said integrating circuit.

11. An apparatus as defined by claim 8, wherein said first timer means comprises two transistors (T22, T23) and a capacitor (89) which are connected to form a first Miller integrator receiving the output signal from said comparator means and generating said timer output signal.

12. An apparatus as defined by claim 11, wherein said integrator means includes an operational amplifier (17) having an input connected to receive the timer output signal from said first Miller integrator and having an output, for switching the output of said operational amplifier (17) to a predetermined output state upon receipt of said timer output signal.

13. An apparatus as defined by claim 11, wherein:
 said comparator means includes a first input connected to receive said sensor signal and a second input; and
 said second timer means comprises a second Miller integrator, including first and second transistors (T25) and (T26), each having a base; an emitter and a collector, and an integrating capacitor (106), for supplying an output signal to the second input of said comparator means which gradually increases after switchover from closed to open loop control and which gradually decreases after switchover from open to closed loop control.

14. An apparatus as defined by claim 13, including an adjustable voltage divider circuit made up of two resistors (210, 211) connected in series and including a connection between the junction (P5) of the two resistors (210, 211) through a diode (212) with the input of said second timer means and further including a connection between the circuit junction point (P5) through a diode (213) with the output of the comparator means;
 whereby the diode (212) is arranged to be blocked and the second timer means is also arranged to be blocked whenever said oxygen sensor indicates a rich fuel-air mixture.

15. An apparatus as defined by claim 14, which further comprises:
 means for generating fuel injection control pulses;
 a contact (220) connected to receive said fuel injection pulses; and
 a diode (221);
 wherein the circuit point (P5) between resistors (210, 211) is connected through the diode (221) with the contact (220) which carries the fuel injection pulses whereby the decrease of the reference signal is made cylically load-dependent.

16. An apparatus as defined by claim 15, further including a transistor (R208) controlled by said fuel injection control pulses, said transistor (T208) being connected via a diode (103') with the input of said second timer means;
 whereby a change of the input signal of the second timer means causes a load-dependent cyclic control of the reference signal increase.

17. An apparatus as defined by claim 16, further including a diode (200) and a voltage divider circuit consisting of two series-connected resistors (201, 202) whose junction is connected through said diode (200) with the output of the second timer means;
 whereby a decrease of the oxygen sensor current takes place only after a predetermined reference signal is exceeded in the downward direction.

18. An apparatus as defined by claim 14, which further comprises:
 a diode (230); and
 voltage divider means for providing a signal which is lower than the reference signal when the second timer means is blocked, corresponding to open loop operation;
 wherein the capacitor (106) of the second Miller integrator is connected through the diode (230) to the collector of the second transistor (T26) of the second Miller integrator, and the junction of the capacitor (106) and the diode (230) is connected to receive said signal provided by said voltage divider means.

19. An apparatus as defined by claim 18, wherein said apparatus includes positive and negative power supply lines, a line (109) having a substantially constant positive signal, and a transistor (T24) having a base connected to receive said timer output signal, a collector, and an emitter, the collector-emitter circuit of said transistor (T24) being connected between said positive and negative supplies lines, and wherein said voltage divider means consists of a series connection of two resistors (232, 233) and a diode (234) which are connected to conduct from said line (109) to the collector of the transistor (T24) which blocks at the onset of closed loop control.

20. An apparatus as defined by claim 19, including a diode (103") wherein the collector of the transistor (T24) is connected through the diode (103") to the base of the first transistor (T25) of the second Miller integrator.

21. An apparatus as defined by claim 8, wherein said comparator means includes:
 an operational amplifier (12) having an output, an inverting input, and a non-inverting input;
 a transistor amplifier (T9) having an output connected to the inverting input of said operational amplifier (12) and having a base input connected to receive said sensor signal; and a transistor amplifier (T11) having an output connected to the non-inverting input of said operational amplifier (12), and having a base input connected to receive said reference signal.

22. An apparatus as defined by claim 21, which further comprises:
operational signal generating means for generating an operational signal related to an operating condition of the engine;
an input terminal (156) for receiving said operational signal; and
an input circuit from the input terminal to the base input of the transistor amplifier (T11) having an output connected to the non-inverting input of the operational amplifier (12) of the comparator means;
whereby the output of said transistor amplifier (T11) is influenced by the operational signal.

23. An apparatus as defined by claim 21, which further comprises a series combination of a diode (183) and a resistor (182) connected from the base input of the transistor amplifier (T9) to the output of the second timer means; whereby said base input receives a gradually increasing signal during the open loop control phase of the apparatus.

24. An apparatus as defined by claim 21, wherein said comparator means includes:
a direct electric power supply having positive and negative supply lines;
at least one resistor element;
a Zener diode (41) connected in series with said at least one resistor element between the positive and negative supply lines; and
a first resistor (43), an adjustable second resistor (44) connected to said first resistor (43), and a silicon diode (48), connected to one of said first and second resistors (43, 44) and to said Zener diode to form a three element series combination which is connected in parallel with said Zener diode (41) whereby, after said second resistor (44) is adjusted, a temperature compensated stabilized signal may be obtained between the junction (49) of said first and second resistors (43, 44) and the junction of the silicon diode (48) and the Zener diode (41).

25. An apparatus as defined by claim 24, including a voltage divider circuit consisting of a resistor (51) and an adjustable resistor (52) connected to said junction (49) of said resistors (43 and 44) from which it receives said stabilized and temperature-compensated signal for providing a portion thereof to said comparator means.

26. An apparatus as defined by claim 24, which further comprises a transistor (108) having a base connected to the cathode of said Zener diode, a collector connected to the positive supply line and an emitter connected to a conductor (109) which thereby is provided with a substantially constant, stabilized signal.

27. An apparatus as defined by claim 26, wherein said second timer means comprises a second Miller integrator including an integrating capacitor (106) and first and second transistors (T25, T26) each having a base; an emitter, and a collector, and said apparatus further comprises a resistor (107) wherein the collector of said second transistor (T26) in said second timer means is connected through said resistor (107) to said conductor (109) carrying said stabilized signal.

28. An apparatus as defined by claim 27, wherein said first timer means includes:
a transistor (T24) having a base connected to receive said timer output signal, a collector connected to the positive supply line, and an emitter connected to the negative supply line;
a transistor (T121) having an emitter connected to the collector of said transistor (T24) in said first timer means, and a collector;
a series combination of two resistors (126, 127) connected between the collector of said transistor (T121) and the negative supply line;
a series combination of a high value resistor (128) and a diode (129) connected from the junction of said resistors (126 and 127) to the base input of said transistor amplifier (T9) associated with the inverting input of said operational amplifier (12) and supplied with the sensor signal from said oxygen sensor;
whereby a predetermined precise current is provided to said oxygen sensor.

29. An apparatus as defined by claim 28, which further comprises an adjustable combination of a resistor (132) and a resistor (133) connected between the collector of the transistor (T121) and the base of the transistor (T11).

30. An apparatus according to claim 29, including a resistor (83) and means for supplying a signal proportional to fluctuations of the power supply through said resistor (83) and said transistor (T9) to the inverting input of said operational amplifier (12) which normally receives the signal from said oxygen sensor; whereby the fluctuations of the signal from said Zener diode are compensated.

31. An apparatus as defined by claim 30, wherein said at least one resistor element connected in series with the Zener diode (41) between the positive and negative supply lines comprises two resistors (38, 39) connected together in series, and the signal associated with fluctuations in the power supply and fed to the input of said operational amplifier (12) is derived from the junction of said resistor (38) and said resistor (39) which are connected in series with said Zener diode.

32. An apparatus as defined by claim 31, which further comprises a series combination of a resistor (117) connected to the conductor (109), a resistor (118) connected to the resistor (117), and a diode (119) having an anode connected to the resistor (118) and a cathode connected to the output of the operational amplifier (12); and
a resistor (161) connected between the junction of resistor (117) and resistor (118) and the non-inverting input of said operational amplifier (12); whereby the shift characteristics of said operational amplifier (12) are sharpened.

33. An apparatus as defined by claim 32, wherein said first timer means comprises two transistors (T22, T23), each having a base, an emitter and a collector, and a capacitor (89), which are connected as a first Miller integrator receiving the output signal from said comparator means and generating said timer output signal, and said apparatus further comprises a capacitor (155) connected in parallel with the base-emitter path of said first transistor (T22) in said first timer means; whereby the immediate switchover into the open loop control state is enhanced.

34. An apparatus as defined by claim 33, which further comprises a series combination of a diode (190) and a switching element (189) connected between the base of the transistor (T22) and the negative supply line, said switching element (189) being closing during engine starting.

35. An apparatus as defined by claim 8, wherein said integrating means includes two transistors (T14, T16) of different bi-polar type each having a base, a collector, and an emitter and an operational amplifier (17) having an inverting input, a non-inverting input, and an output, wherein the transistors (T14, T16) are controlled by said comparator means and are so connected that only one transistor conducts while the other blocks, and wherein said integrating means further comprises a resistor (71) connected between the inverting input of the operational amplifier (17) and a circuit point (69), an adjustable resistor (67) connected between the circuit point (69) and the collector of transistor (T14), and a further adjustable resistor (68) connected between the circuit point (69) and the collector of transistor (T16).

36. An apparatus as defined by claim 35, including means for generating an rpm-synchronous signal, wherein said transistor (T14) and transistor (T16) receive the output signal from said comparator means and said integrating means further includes a transistor (T138) controlled by the rpm-synchronous signal, whereby an adjustment of the integrating means, in response to said signal from said comparator means, can take place only when said transistor (T138) is blocked so that control oscillations at low engine rpm are prevented.

37. An apparatus as defined by claim 36, wherein the rpm-synchronous signal is a fuel injection timing signal.

38. An apparatus as defined by claim 36, which further comprises means for generating a full load signal, and wherein said integrating means further includes at least one adjustable resistor, and a transistor (T144) controlled by the full load signal, having a collector connected to the inverting input of said operational amplifier (17) in said integrating means, the collector and an emitter of the transistor (T144) forming a collector-emitting path connected via said at least one adjustable resistor to the output of said operational amplifier (17), thereby generating an output signal corresponding to full load engine conditions.

39. An apparatus as defined by claim 38, which further comprises:
an input terminal (143) for receiving said full load signal; and
an input circuit from said input terminal to said integrating means, which includes a low pass filter including a coil (148) and a grounded capacitor (194) for blocking high frequency signal components.

40. An apparatus as defined by claim 38, wherein said comparator circuit includes an electric power supply having positive and negative supply lines, the emitter of said full load transistor (T144) is connected directly to the negative supply line, said integrating means further includes a diode (154), and said at least one adjustable resistor comprises two parallel adjustable resistors (152, 153) connected in series with said diode (154) from the collector of said transistor (T144) to the output of said operational amplifier (17).

41. An apparatus as defined by claim 40, which further comprises: a transistor (T24) having a base connected to receive said timer output signal, an emitter connected to the negative supply line, and a collector connected to said positive supply line; a diode (101) and parallel, adjustable resistors (98, 99) connected in series with said diode (101) from the collector of transistor (T24) to the output of said operational amplifier (17) for generating a suitable output signal during the open loop control state; and a series combination of a diode (96) and a resistor (97) connected from the collector of said transistor (T24) to the inverting input of the operational amplifier (17); whereby said operational amplifier is disabled during the open loop control state.

42. An apparatus as defined by claim 41, which further comprises a temperature switch (186, 184) connected between the collector of said transistor (T24) and the negative supply line; whereby a desired control state is maintainable.

* * * * *